(12) United States Patent
Nelson

(10) Patent No.: US 11,392,632 B1
(45) Date of Patent: Jul. 19, 2022

(54) SYSTEMS AND METHODS FOR LOCATING MEDIA USING A TAG-BASED QUERY

(71) Applicant: SimpleC, LLC, Atlanta, GA (US)

(72) Inventor: Douglas Nelson, Atlanta, GA (US)

(73) Assignee: SimpleC, LLC, Atlanta, GA (US)

( * ) Notice: Subject to any disclaimer, the term of this patent is extended or adjusted under 35 U.S.C. 154(b) by 394 days.

(21) Appl. No.: 15/837,200

(22) Filed: Dec. 11, 2017

Related U.S. Application Data

(60) Provisional application No. 62/432,800, filed on Dec. 12, 2016.

(51) Int. Cl.
*G06F 16/48* (2019.01)
*G06F 16/438* (2019.01)
*G06F 40/205* (2020.01)

(52) U.S. Cl.
CPC ............ *G06F 16/48* (2019.01); *G06F 16/438* (2019.01); *G06F 40/205* (2020.01)

(58) Field of Classification Search
CPC ..... G06F 16/48; G06F 16/438; G06F 17/2705
See application file for complete search history.

(56) References Cited

U.S. PATENT DOCUMENTS

| | | | | |
|---|---|---|---|---|
| 2011/0137910 A1* | 6/2011 | Hibino | ............... | G06F 16/583 707/741 |
| 2011/0173214 A1* | 7/2011 | Karim | ............... | G06F 16/148 707/754 |
| 2012/0259926 A1* | 10/2012 | Lockhart | ............... | H04L 51/10 709/206 |
| 2013/0316324 A1* | 11/2013 | Hoffmann | ............... | G09B 7/00 434/362 |
| 2016/0253410 A1* | 9/2016 | Gandert | ............. | G06F 16/3338 707/767 |
| 2017/0364520 A1* | 12/2017 | Venkataraman | .... | G06F 16/3329 |
| 2018/0121530 A1* | 5/2018 | McGregor | ............. | G06F 16/27 |

FOREIGN PATENT DOCUMENTS

WO    WO-2009153392 A1 * 12/2009    ......... G06F 16/9535

* cited by examiner

*Primary Examiner* — Ashish Thomas
*Assistant Examiner* — Yohanes D Kelemework
(74) *Attorney, Agent, or Firm* — Jones Day

(57) ABSTRACT

Systems and methods are provided for locating assets using a tag-based query. A computer-implemented method for identifying relevant media assets may include the operations of associating metadata with stored media assets, receiving a query that includes one or more query expressions identifying at least a tag and an attribute for a set of desired media assets, and comparing the one or more query expressions with the metadata for each stored media asset to identify the set of desired media assets. The metadata for each media asset may include tag metadata and attribute metadata, where attribute metadata identifies one or more pre-defined attributes of the media asset, and tag metadata is not limited to any pre-defined set.

15 Claims, 7 Drawing Sheets

SYSTEMS AND METHODS FOR LOCATING MEDIA USING A TAG-BASED QUERY

CROSS-REFERENCE TO RELATED APPLICATION

This application claims priority to U.S. Provisional Patent Application No. 62/432,800, filed Dec. 12, 2016, entitled "Search Engine for Locating Media Based on a Tag Query Language," which is incorporated herein by reference in its entirety.

TECHNICAL FIELD

The technology described herein relates to a search engine and more particularly to a programming language performing a content search.

BACKGROUND

Search algorithms are generally configured to analyze a corpus of texts to identify portions in the search corpus that match texts in a query. Such algorithms are effective in searching text-based media corpuses. But such algorithms can be ineffective in some scenarios, such as searching of non-text media, which in many instances has no text or limited text (e.g., a file name) associated with the non-text media to be searched.

SUMMARY

Systems and methods are provided for locating assets using a tag-based query. A computer-implemented method for identifying relevant media assets may include the operations of associating metadata with stored media assets, receiving a query that includes one or more query expressions identifying at least a tag and an attribute for a set of desired media assets, and comparing the one or more query expressions with the metadata for each stored media asset to identify the set of desired media assets. The metadata for each media asset may include tag metadata and attribute metadata, where attribute metadata identifies one or more pre-defined attributes of the media asset, and tag metadata is not limited to any pre-defined set.

A system for identifying relevant media assets may include one or more data stores configured to store media assets and associated metadata for each stored media asset, and a query evaluation engine. The metadata for each media asset may include tag metadata and attribute metadata, where attribute metadata identifies one or more pre-defined attributes of the media asset, and tag metadata is not limited to any pre-defined set. The query evaluation engine may be configured to receive a query that includes one or more query expressions identifying at least a tag and an attribute for a set of desired media assets, and compare the one or more query expressions with the metadata for each stored media asset to identify the set of desired media assets. In embodiments, the system may further include a therapy playback engine configured to retrieve the set of desired media assets from the stored media assets, and display the retrieved set of desired media assets in a therapy session.

DETAILED DESCRIPTION

Systems and methods as described herein provide a mechanism for locating assets, such as media assets, using a tag query language (TQL) that offers improved performance over traditional text based searches.

In one implementation example, an organization has a vast store of content assets including but not limited to images, videos, and audio. These assets are loosely organized. That is to say that each asset resides "in" a single category (or folder). In an example implementation, the categories and the assets both have tags, or keywords, associated with them. A tag is a type of metadata that may be descriptive in nature, such as "beach" or "calming." Tags are an unrestricted form of metadata in that a user is not restricted to a pre-defined set of tag words or attributes when adding a tag to describe a stored asset. Tags may also be tokens used for keyed searches. Stored assets (as well as categories of stored assets) may also have other associated metadata that identifies one or more pre-defined attributes of the asset or asset category. For example, a song might have metadata to identify pre-defined attributes such as title, publisher, publish date, and beats per minute. Audio and video might have duration metadata. Other pre-defined asset attributes that may be identified by metadata include a unique asset identification, an ownership designation for the asset, an asset category, and an asset type. Such pre-defined types of metadata are referred to herein as "attribute metadata," and may be distinguished from "tag metadata."

An organization may seek a method for simple, open ended search capabilities that span the assets and categories. Writing custom SQL against a database for each new tag or meta property is cumbersome and time consuming. A search system, as described herein, may include a query language that can be executed against the store of assets and categories. Systems and methods as provided herein describe a query language that is open and extensible. The query language is apt for querying for assets against an asset store.

Figure 1:
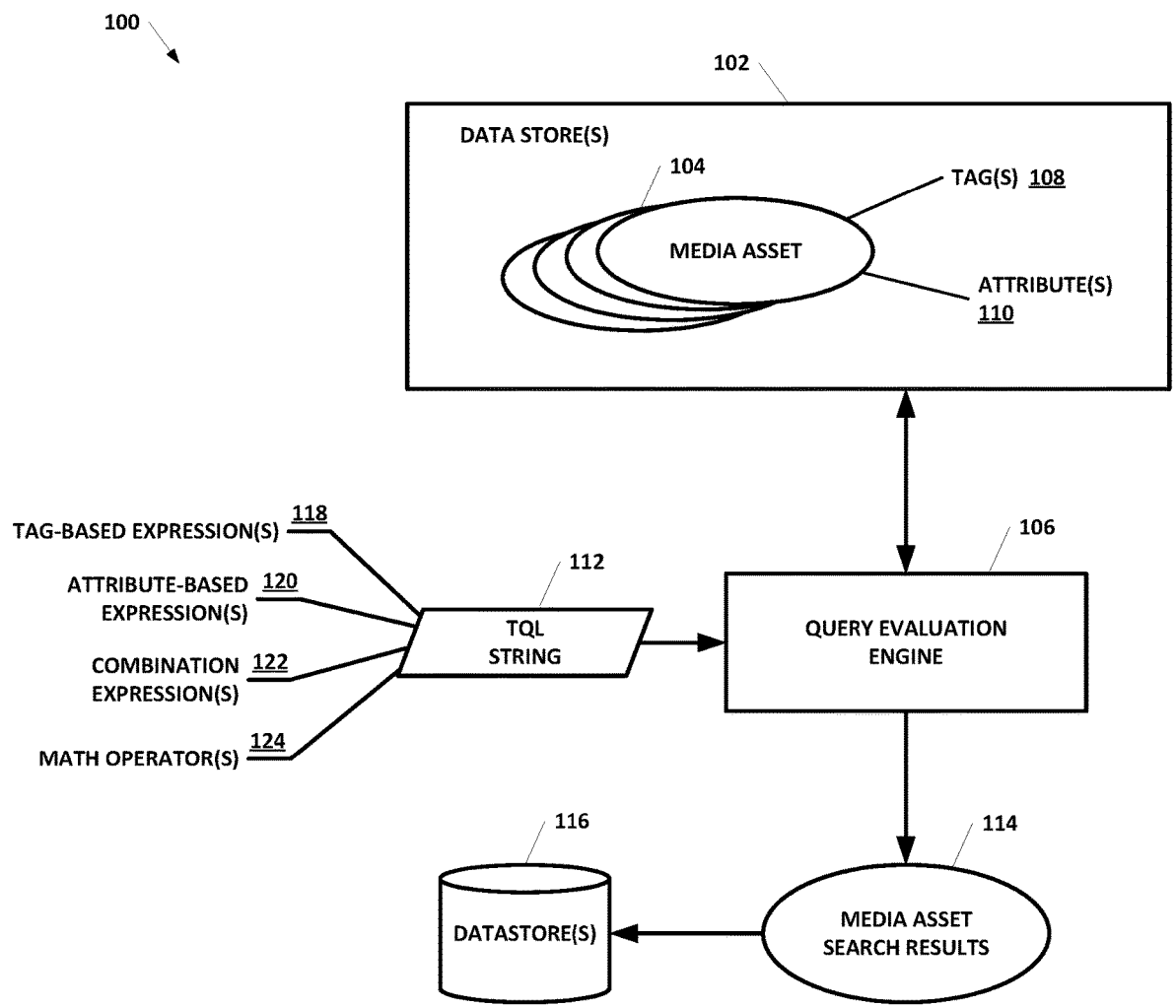
FIG. 1 is a block diagram illustrating an example system for locating media using a tag-based query.

FIG. 1 is a block diagram of an example system 100 for locating media using a tag-based query. The system 100 includes one or more data stores 102 for storing a plurality of media content assets 104 and a query evaluation engine 106 for performing tag-based queries to identify one or more media assets 104 from the data store(s) 102. The media assets 104 may include media files such as images, videos, and/or audio content, but in other embodiments could also include other types of content assets. The media assets 104 may, for example, be stored on one or more local data stores 102. In other embodiments, however, the media assets 104 may be stored on one or more data stores in a network or cloud computing environment. In different embodiments, the plurality of media assets 104 may all be stored on the same data store or may be distributed across multiple data storage devices and/or systems. The media assets 104 may, in certain embodiments, be loosely organized without any defined file categorization, for instance "in" a single category (or folder.)

As illustrated, each of the plurality of media asset 104 is stored with associated tag and attribute metadata 108, 110. Tag and attributed metadata 108, 110 may, for example, be associated with stored media assets 104 in one or more relational database tables. As detailed above, tag metadata 108 (also referred to herein as a "tag") is an unrestricted form of metadata that is typically descriptive in nature. Attribute metadata 110 is metadata that identifies one or more pre-defined attributes of the asset or asset category. Tag metadata 108 may, for example, be added by a system user when storing, viewing or editing a media asset. For example, a user viewing or storing a picture of the beach might add a tag to describe the picture as "calming" or to identify the picture as a "favorite" or relating to a "vacation." Attribute metadata 110 may be added by a user or may be automatically added based on one or more pre-defined attributes of the media asset 104. The following are several non-limiting examples of types of attribute metadata 110 that may be stored in association with a media asset or a group of media assets.

scope: "Scope" metadata is used to provide ownership or permission information, identifying who has access to the asset. Examples of scope metadata include "global" (indicating that the asset is globally accessible), "personal" (limiting access to a particular user), and "community" (limiting access to a group of users.)

category: "Category" metadata is used to group assets together (like a folder.)

type: "Type" metadata identifies the media type of the asset, for example, audio, visual, url, document, etc.

unique id: "Unique id" metadata may be used to provide a unique identifier to an asset (such as a name, number or other identification).

The query evaluation engine 106 may, for example, be a software module that is stored in a computer-readable medium and executed by a processor to identify stored media assets 104 using a tag query language (TQL). As illustrated, the query evaluation engine 106 is configured to receive a TQL string 112, search the data store(s) 102 for one or more media assets 104 that meet the requirements of the TQL string 112, and generate search results 114 that include the one or more identified assets. The media asset search results 114 may, for example, be stored in a data store 116 for display to the user or for use by another application. An example operation of the query evaluation engine 106 is described below with reference to the flow diagram set forth in FIG. 2.

The TQL string 112 may include one or more tag-based query expressions 118, one or more attribute-based query expressions 120, and/or one or more combination query expressions 122. A tag-based query expression 118 is a query expression that defines search parameters using tag metadata, an attribute-based query expression 120 is a query expression that defines search parameters using attribute metadata, and a combination query expression 122 is a query expression that defines search parameters using a combination of tag and attribute metadata.

In embodiments, the TQL string 112 may be driven by a set of math operators 124, where the values in the sets are identities of assets. The query evaluation engine 106 may use operators for doing set math, such as: +, XOR, AND. In one example:

[1, 2, 3]+[2,8.9] would result in [1, 2, 3, 8, 9]
Note that the value "2" was not repeated in the result set.

Built on top of the query evaluation engine 106 are the query language components 118, 120, 122. In one implementation, these components are enclosed in begin/end character markers, which can take a variety of forms. Examples presented herein use ${expression} as the pattern, where expression is a query component. In embodiments, expression can be a variable, if the system is using the engine programmatically. That is, a system could set the variable "a" equal to [1,2,3]. The system could then use the engine to evaluate ${a}+${some expression}.

Query expressions can be more complex. In one example, a query expression follows the pattern: [qualifier][query]

In one embodiment, qualifiers are either '@' or '#', where @ represents a specific asset or group of assets, and # represents a query against the data store.

Specific Asset Examples:

${@category/1234} would represent all of the assets in category ID 1234

${@item/5678} would represent asset ID 5678

${@therapy/9000} would represent all of the assets in therapy ID 9000

Note that "therapy," in the above example, is defined as a TQL expression. Including a specific therapy creates a nested query expression by injecting a separate expression into the current expression.

queries are more complex in certain implementations. A # query can take many forms. A basic form is:

${#scope/scopeType/search_value}

In one embodiment, scope or scopeType are required, but not both. A search value is a necessary input in one implementation.

Scope values can be business specific. For example, in an organization that manages images for inclusion in therapy presentations for patients having cognitive diseases/disabilities like dementia, scope values are "global" (from the public pool of assets), "community" (from a pool of assets owned by a community), "personal" (from the pool of assets owned by an individual), "category" find assets within categories that match, "item" find items that match, "therapy" find assets in therapies that match.

ScopeType can also be business specific. In the therapy context noted above, a system uses "visual", "audio", "media" (all), "trusted" (e.g., voice recordings of an individual that the patient knows and trusts—a subset of audio for a specific purpose).

Tag Query Examples:

${#audio/*}—All audio—* is a wildcard ${#audio/calming}—all audio that has a "calming" tag associated with it ${#global/beach}—all assets from the global pool that have a "beach" tag ${#global/visual/beach}—all visual assets from the global pool that have "beach" tag ${#category/beach}—all assets from categories that have "beach"

${#category/audio/beach}—all audio assets from categories that have "beach"

Expressions can be combined into hierarchical queries that are evaluated into a result set of asset IDs. For example:

${#audio/calming} AND ${#audio/classical}=a set of all audio assets that are an intersection of the sets of calming and classical;

(${#audio/calming} AND ${#audio/classical})+${#visual/beach}=the above set of audio plus all visual assets with a beach tag.

In one implementation, a system can include created functions. For example, a

"pickone" function can be defined that randomly picks one content item from expressions:
Pickone([1,2,3], ${#visual/beach}, ${#visual/fishing}) would result in one of the three sets.

Figure 2:
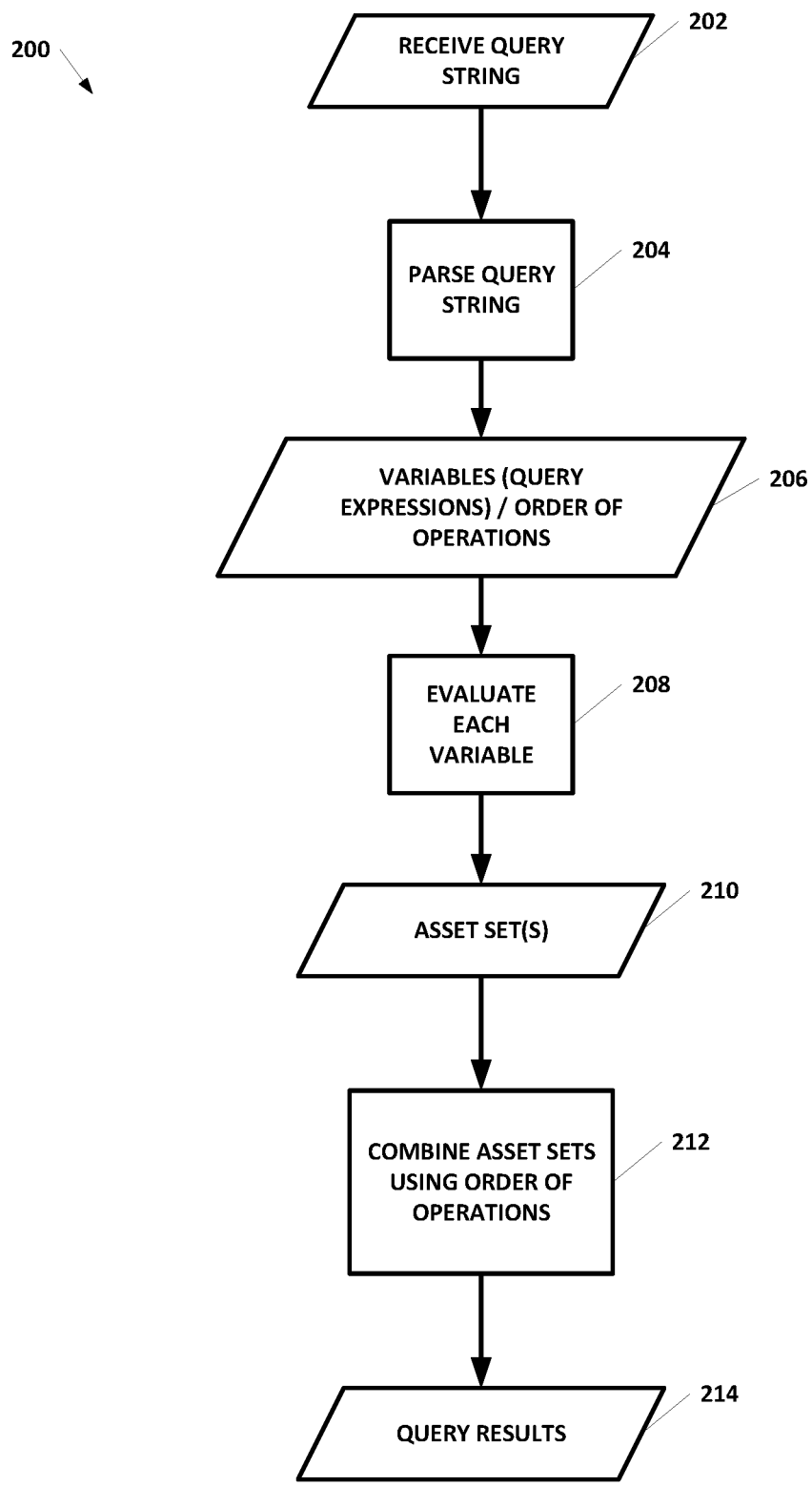
FIG. 2 is a flow diagram of an example method for locating media using a tag-based query.

FIG. 2 is a flow diagram of an example method 200 for locating media using a tag-based query. The method 200 may, for example, be performed by the query evaluation engine 106 of FIG. 1. At 202, a TQL query string is received, for example as described above with reference to FIG. 1. An example TQL query string might be: ${@item/5678}+${@category/1234}+(${#global/beach}−${#global/shark}). In this example, ${@item/5678} and ${@category/1234} are attribute-based query expressions in that they define search parameters using attribute metadata (category/1234 and item/5678), and ${#global/beach} and ${#global/shark} are combination query expressions in that they define search parameters using both attribute metadata (global) and tag metadata (beach and shark). The above example should return a search result that includes asset id 5678 plus all assets in category 1234 plus any assets that are tagged with beach but not with shark.

At 204, the query string is parsed into a mathematical/functional expression. Specifically, the TQL query is parsed to create a list of included variables (i.e., query expressions) to evaluate and the order in which to perform set operations. For instance, in the example set forth above, the list of variables parsed from the TQL expression would be {@item/5678}, {@category/1234}, {#global/beach}, and {#global/shark}. The order to perform set operations is derived from the mathematical operators in the TQL query string. In the above example, the operation ${#global/beach}−${#global/shark} would be performed, followed by the addition operations ${@item/5678}+${@category/1234}+(${#global/beach}−${#global/shark}).

As shown at 206, the output of the parsing operation is a list of variables (i.e., query expressions) and the order in which the set operations are to be performed.

At 208, each variable (i.e., query expression) is evaluated against the database of stored media assets to return a set of identified assets 210 for each variable. In other words, each query expression parsed from the TQL string is compared with the tag and attribute metadata associated with the stored media assets to identify any media assets matching the parameters of the query expression. Any media assets with associated metadata matching the query expression (if any) are stored in an asset set for the query expression. For instance, in the above example, asset sets would be created for each of the query expressions {@item/5678}, {@category/1234}, {#global/beach}, and {#global/shark}. If no stored assets match the parameters of a query expression, then the asset set for that expression would be empty.

At 212, the arithmetic operations (parsed from the TQL query) are performed to combine the assets from the individual asset sets 210 using the order of operations. The output of operation 212 is query results that identify a single set of assets meeting the full parameters of the TQL query string.

In certain embodiments, a TQL system can be utilized as a mechanism for defining therapies (interventions) that are delivered to consumers. In one example, a series of media items are presented to the consumer as a therapy in order to achieve a goal. For example, for a patient who has trouble calming at the end of a day from a dementia related symptom, a series of images, videos, and audio media may be presented to sooth the patient and promote on-time sleep. A TQL implementation may be utilized so that the same media assets are not presented in the same order each evening. Such a stale presentation could stunt progress toward the desired goal. The open ended, extensive framework provides flexibility and scalability across innumerable content assets.

Figure 3:
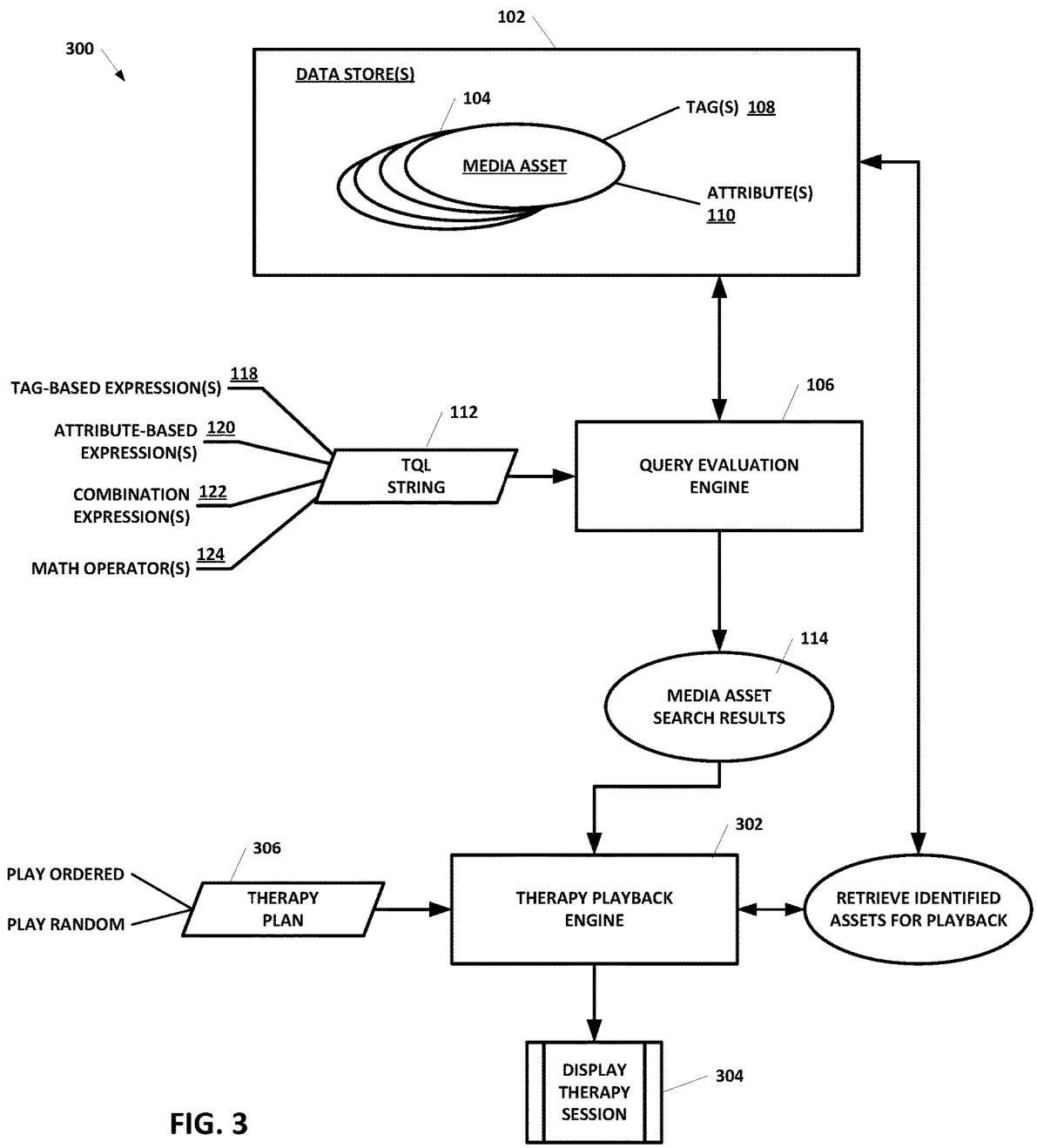
FIG. 3 is a block diagram of an example system for locating media using a tag-based query and displaying the media in a therapy session.

FIG. 3 is a block diagram of an example system 300 for locating media using a tag-based query and displaying the media in a therapy session. The illustrated example includes a query evaluation engine 106 that is configured to receive a TQL string 112, search a data store(s) 102 for one or more media assets 104 that meet the requirements of the TQL string 112, and generate search results 114 that include the one or more identified assets, as described above with reference to FIG. 1. The query results 114, in this example, are provided to a therapy playback engine 302 that is configured to retrieve the media assets identified in the search results for display 304 to a patient according to a therapy plan 306.

The therapy plan 306 may, for example, include an indication of whether the media assets identified in the search results 114 should be played in an order in which they are stored or played in a random order. Using this ordering information identified in the therapy plan 306, the therapy playback engine 302 may retrieve the media assets from the data store(s) 102 in the order designated for playback. In different examples, the therapy playback engine 302 may be configured to retrieve the media assets 104 and play the assets using the appropriate type(s) of media playback application (e.g., video, audio, etc.), or may be configured to play the identified assets using one or more media streaming applications.

Figure 4:
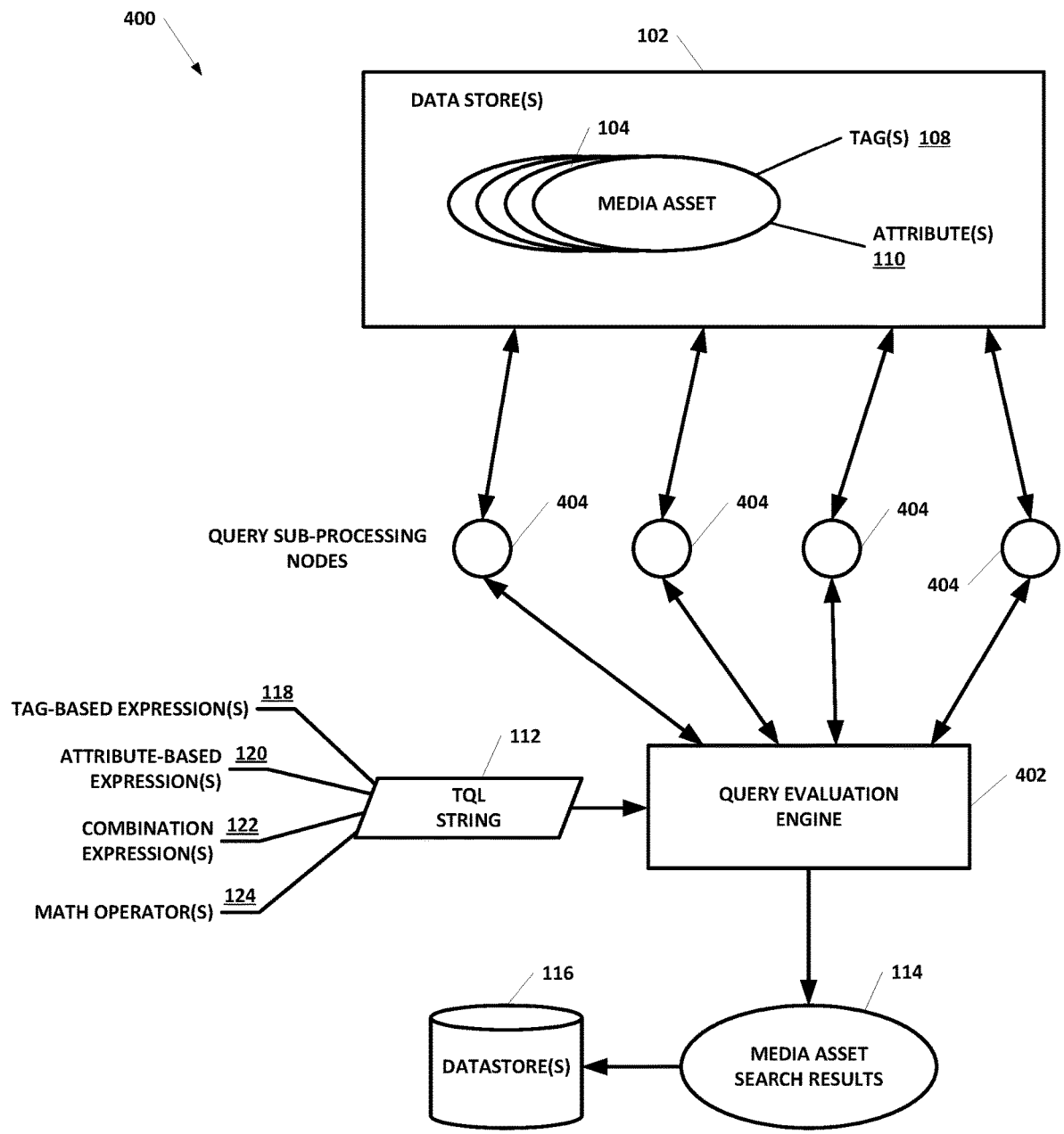
FIG. 4 is a block diagram of another example system for locating media using a tag-based query.

FIG. 4 is a block diagram of another example system 400 for locating media using a tag-based query. In this example, the query evaluation engine 402 operates to perform the TQL query 112 with the assistance of a plurality of query sub-processing nodes 404. The query sub-processing nodes 404 may improve performance of the query evaluation engine 402 by performing certain query evaluation operations in parallel. The query sub-processing nodes 404 may, for example, be software modules that are stored on one or more computer-readable mediums and executed by one or more processors to perform database query operations under the control of the query evaluation engine 402. In different examples, the query sub-processing nodes 404 may reside on the same processing system as the query evaluation engine 402 or may operate on different processing systems in a distributed system.

In one example, the query sub-processing nodes 404 may be used to perform operation 208 shown in FIG. 2 in a parallel manner. For example, the query evaluation engine 402 may parse multiple query expressions from a TQL string 112 and then provide each expression to a different query sub-processing node 404 for evaluation against the database 102 of stored media assets. As an example, if the query evaluation engine 402 receives the TQL string ${@item/5678}+${@category/1234}+(${#global/beach}−${#global/shark}), each of the included query expressions, {@item/5678}, {@category/1234}, {#global/beach}, and {#global/shark}, may be forwarded to a different query sub-processing node. Each query sub-processing node 404 would then compare its query expression with the tag and attribute metadata associated with the stored media assets to provide the query evaluation engine 402 with a matching asset set for the query expression. The query evaluation engine 402 may then combine the assets from the individual asset sets according to the mathematical operations and order of operations specified by the TQL string 112 to generate the asset search results 114.

The methods and systems described herein may be implemented using any suitable processing system with any suitable combination of hardware, software and/or firmware, such as described below with reference to FIGS. 5 and 6A-6C.

Figure 5:
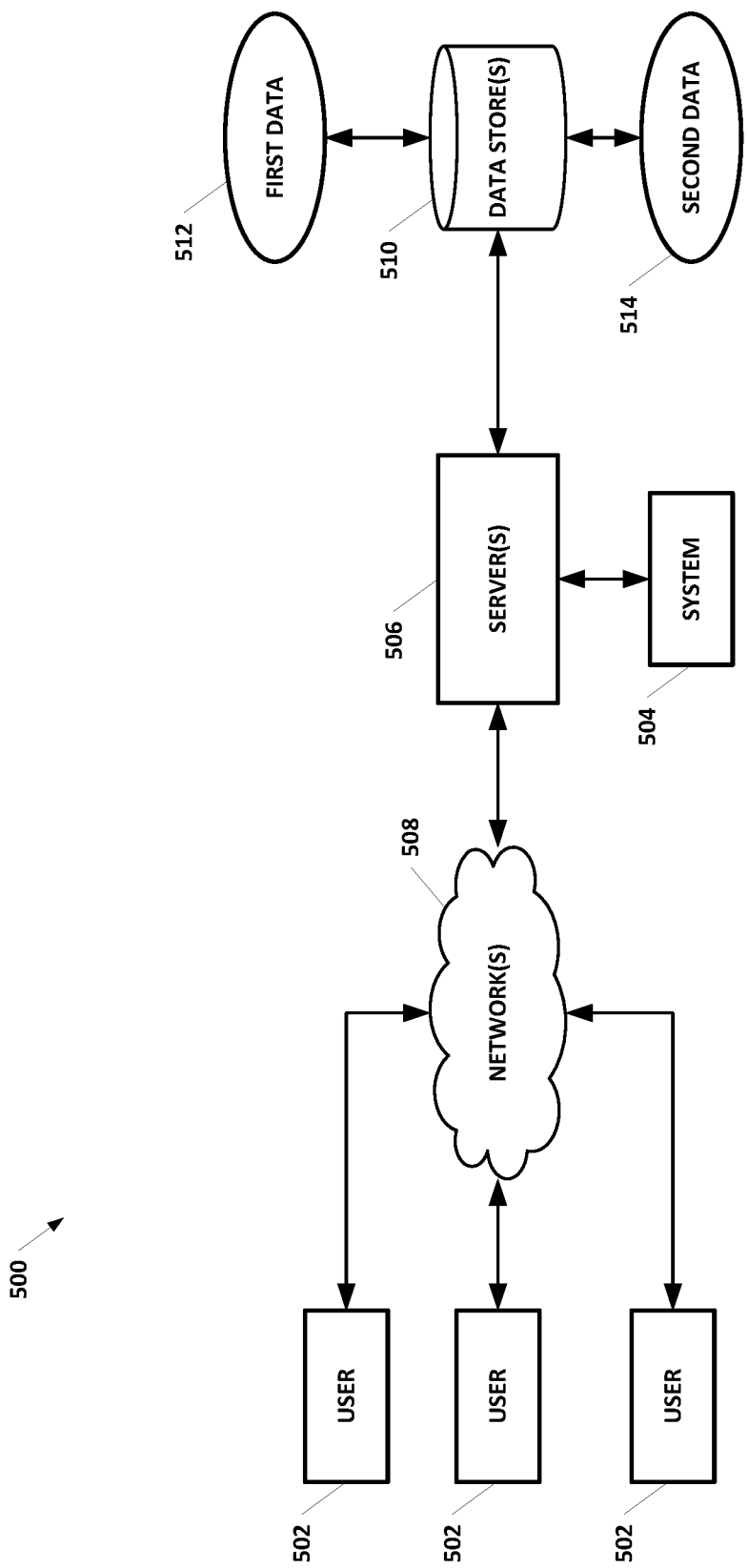
FIG. 5 depicts an example computer-implemented environment.

FIG. 5 depicts at 500 a computer-implemented environment wherein users 502 can interact with a system 504 hosted on one or more servers 506 through a network 508. The system 504 contains software operations or routines. The users 502 can interact with the system 504 through a number of ways, such as over one or more networks 508. One or more servers 506 accessible through the network(s) 508 can host system 504. It should be understood that the system 504 could also be provided on a stand-alone computer for access by a user.

Figure 6A:
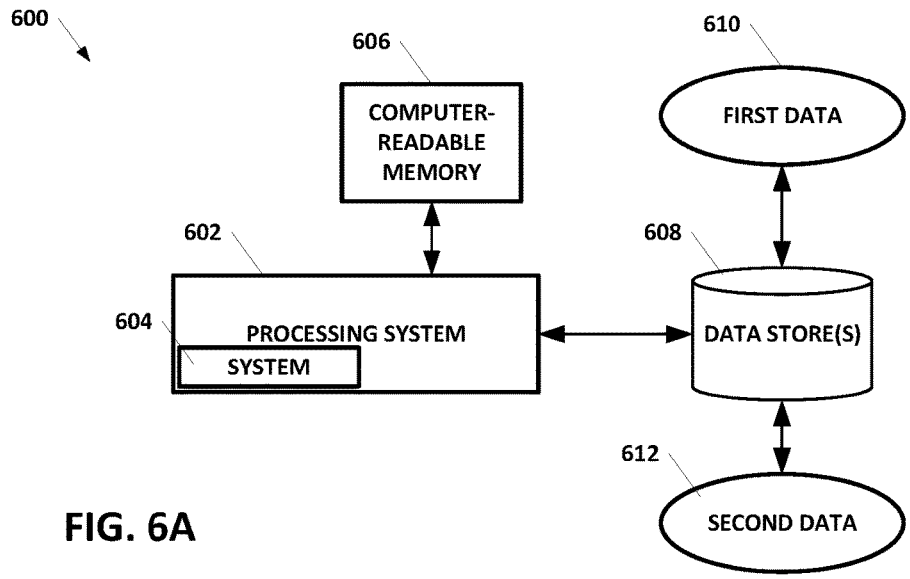
FIGS. 6A-6C depict example systems for using in implementing a system.
Figure 6B:
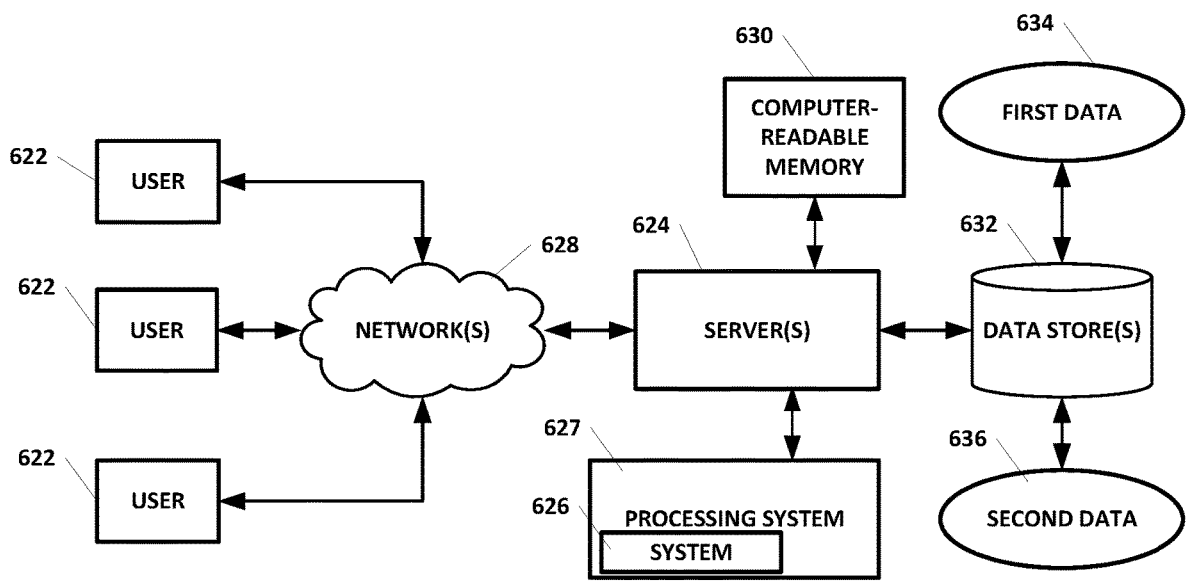
Figure 6C:
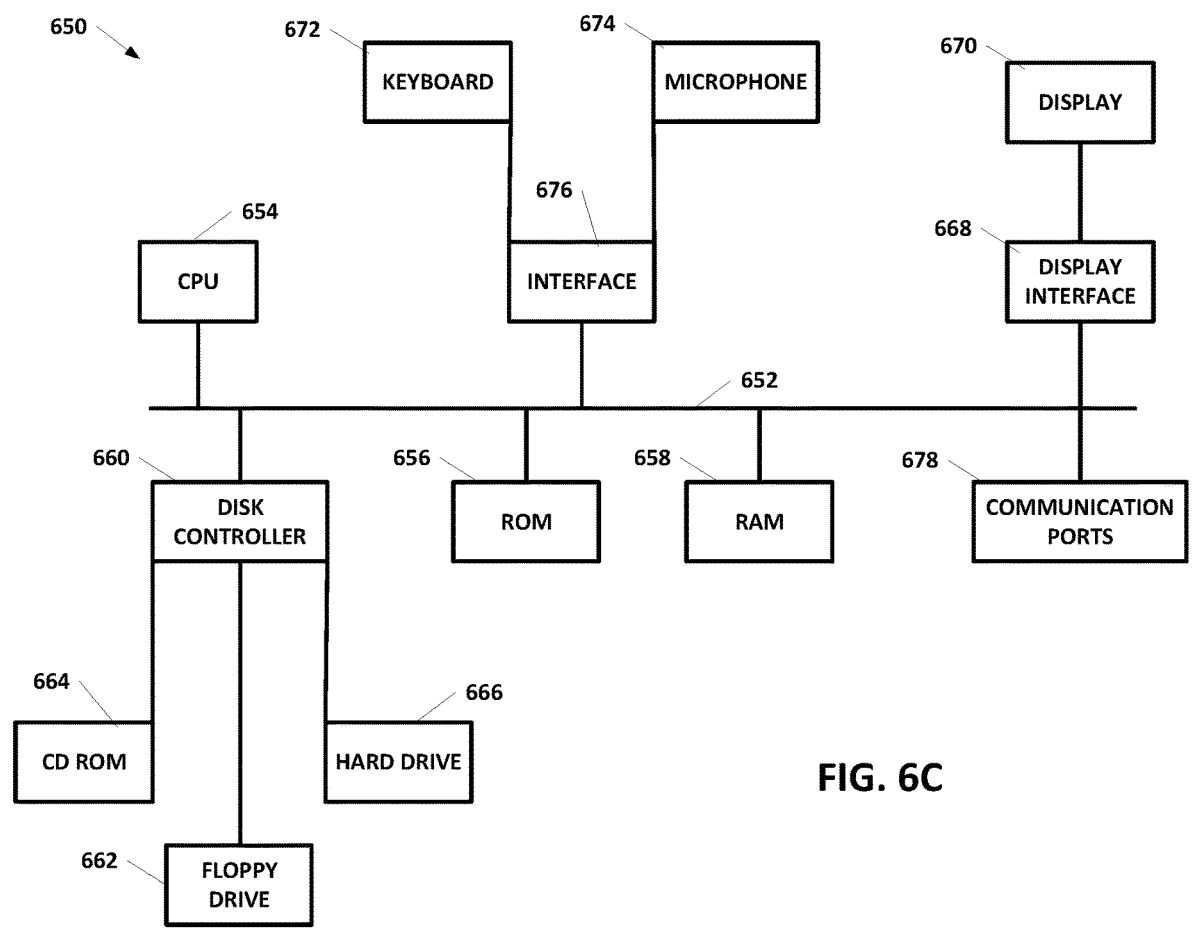

FIGS. 6A-6C depict example systems for use in implementing a system. For example, FIG. 6A depicts an example system 600 that includes a standalone computer architecture where a processing system 602 (e.g., one or more computer processors) includes a system 604 being executed on it. The processing system 602 has access to a non-transitory computer-readable memory 606 in addition to one or more data stores 608. The one or more data stores 608 may contain first data 610 as well as second data 612.

FIG. 6B depicts a system that includes a client server architecture. One or more user PCs 622 accesses one or more servers 624 running a system 626 on a processing system 627 via one or more networks 628. The one or more servers 624 may access a non-transitory computer readable memory 630 as well as one or more data stores 632. The one or more data stores 632 may contain first data 634 as well as second data 636.

FIG. 6C shows a block diagram of example hardware for a standalone computer architecture 650, such as the architecture depicted in FIG. 6A, that may be used to contain and/or implement the program instructions of system embodiments of the present disclosure. A bus 652 may serve as the information highway interconnecting the other illustrated components of the hardware. A processing system 654 labeled CPU (central processing unit)(e.g., one or more computer processors), may perform calculations and logic operations required to execute a program. A non-transitory computer-readable medium, such as read only memory (ROM) 656 and random access memory (RAM) 658, may be in communication with the processing system 654 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communication signal, or a modulated carrier wave, e.g., such that the instructions may then be stored on a non-transitory computer-readable storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated above, these various disk drives and disk controllers are optional devices.

A display interface 668 may permit information from the bus 652 to be displayed on a display 670 in audio, graphic, or alphanumeric format. Communication with external devices may optionally occur using various communication ports 678.

In addition to the standard computer-type components, the hardware may also include data input devices, such as a keyboard 672, or other input devices 674, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for identifying relevant media assets, comprising:
   associating metadata with stored media assets loosely organized without any defined file categorization, the metadata for each media asset including both tag metadata and attribute metadata, wherein attribute metadata identifies one or more pre-defined attributes of the media asset, added either by a system user or automatically based on one or more pre-defined attributes of metadata, and tag metadata is added by the system user and not limited to any pre-defined set, the tag and attribute metadata being associated with the media assets in one or more relational databases;

receiving a therapy plan that identifies an ordering of the set of desired media assets, wherein the therapy plan is developed for a patient with a cognitive disability;

receiving a query that includes one or more query expressions identifying at least a tag and an attribute for the set of desired media assets, the query further including an ordered string of query expressions separated by one or more mathematical operators;

parsing the query to isolate the one or more query expressions and to result in an order in which to perform set operations;

separately comparing each the one or more query expressions with the metadata for each stored media asset to identify the set of desired media assets for each of the one or more query expressions;

combining the asset sets based on the one or more mathematical operators to generate the set of desired media assets;

retrieving the set of desired media assets from the stored media assets according to the ordering identified in the therapy plan; and displaying the retrieved set of desired media assets in a therapy session according to the ordering identified in the therapy plan.

2. The computer-implemented method of claim 1, wherein the string of query expressions includes one or more tag-based query expression that defines one or more search parameters using tag metadata.

3. The computer-implemented method of claim 1, wherein the string of query expressions includes one or more combination query expression that defines search parameters using a combination of tag and attribute metadata.

4. The computer-implemented method of claim 1, wherein each query expression includes a qualifier that identifies whether the query is for a specific asset or for a group of assets.

5. The computer-implemented method of claim 4, wherein the qualifier is an @ symbol when the query is for a specific asset, and the qualifier is a # symbol when the query is for a group of assets.

6. The computer-implemented method of claim 1, wherein the query includes a string of query expressions separated by one or more Boolean operators.

7. The computer-implemented method of claim 1, wherein the stored media assets are loosely organized without any defined file categorization such that all assets reside in a single category or folder.

8. A system for identifying relevant media assets, the media assets loosely organized without any defined file categorization, comprising:

one or more hardware data stores configured to store media assets loosely organized without any defined file categorization, and associated metadata for each stored media asset, the metadata for each media asset including both tag metadata and attribute metadata, wherein attribute metadata identifies one or more pre-defined attributes of the media asset, added either by a system user or automatically based on one or more pre-defined attributes of metadata, and tag metadata added by the system user and is not limited to any pre-defined set, the tag and attribute metadata being associated with the media assets in one or more relational databases;

a data processor; and hardware memory instruction, which when executed by the data processor, execute a query evaluation engine and a therapy feedback engine;

the query evaluation engine configured to,
receive a query that includes one or more query expressions identifying at least a tag and an attribute for a set of desired media assets, the query further including an ordered string of query expressions separated by one or more mathematical operators, parse the query to isolate the one or more query expressions and to result in an order in which to perform set operations, separately compare each the one or more query expressions with the metadata for each stored media asset to identify the set of desired media assets for each of the one or more query expressions, combine the asset sets based on the one or more mathematical operators to generate the set of desired media assets;

the therapy playback engine configured to,
retrieve the set of desired media assets from the stored media assets, receive a therapy plan that identifies an ordering of a set of desired media assets, wherein the therapy plan is developed for a patient with a cognitive disability, retrieve the set of desired media assets from the stored media assets according to the ordering identified in the therapy plan, and display the retrieved set of desired media assets in a therapy session according to the ordering identified in the therapy plan.

9. The system of claim 8, wherein the query evaluation engine controls a plurality of query sub-processing nodes that are configured to operate in parallel to separately compare the one or more query expressions with the metadata for each stored media asset to identify the asset sets.

10. The system of claim 8, wherein the string of query expressions includes one or more tag-based query expression that defines one or more search parameters using tag metadata.

11. The system of claim 8, wherein the string of query expressions includes one or more combination query expression that defines search parameters using a combination of tag and attribute metadata.

12. The system of claim 8, wherein each query expression includes a qualifier that identifies whether the query is for a specific asset or for a group of assets.

13. The system of claim 12, wherein the qualifier is an @ symbol when the query is for a specific asset, and the qualifier is a # symbol when the query is for a group of assets.

14. The system of claim 8, wherein the stored media assets are loosely organized without any defined file categorization such that all assets reside in a single category or folder.

15. A system for identifying relevant media assets, comprising:

at least one data processor; and hardware memory storing instructions which, when executed by the at least one data processor, result in operations comprising:

associating metadata with stored media assets loosely organized without any defined file categorization such that all assets reside in a single category or folder, the metadata for each media asset including both tag metadata and attribute metadata, wherein attribute metadata identifies one or more pre-defined attributes of the media asset, added either by a system user or automatically based on one or more pre-defined attributes of metadata, and tag metadata is added by the system user and not limited to any pre-defined set, the tag and attribute metadata being associated with the media assets in one or more relational databases;

receiving a therapy plan that identifies an ordering of the set of desired media assets, wherein the therapy plan is developed for a patient with a cognitive disability;

receiving a query that includes one or more query expressions identifying at least a tag and an attribute for the set of desired media assets, the query further including an ordered string of query expressions separated by one or more mathematical operators;

parsing the query to isolate the one or more query expressions and to result in an order in which to perform set operations;

separately comparing each the one or more query expressions with the metadata for each stored media asset to identify the set of desired media assets for each of the one or more query expressions;

combining the asset sets based on the one or more mathematical operators to generate the set of desired media assets;

retrieving the set of desired media assets from the stored media assets according to the ordering identified in the therapy plan; and displaying the retrieved set of desired media assets in a therapy session according to the ordering identified in the therapy plan.

\* \* \* \* \*